United States Patent
Strijker et al.

(10) Patent No.: US 6,256,210 B1
(45) Date of Patent: Jul. 3, 2001

(54) CONVERTER FOR CONVERSION OF AN INPUT VOLTAGE INTO AN OUTPUT VOLTAGE

(75) Inventors: Joan Wichard Strijker; Robert Jan Fronen; Antonius Maria Gerardus Mobers, all of Nijmegen (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/578,431

(22) Filed: May 25, 2000

(30) Foreign Application Priority Data

May 26, 1999 (EP) .................................................. 99201654

(51) Int. Cl.$^7$ ................................................. H02M 3/335
(52) U.S. Cl. .................................... 363/21.04; 363/21.05; 363/131
(58) Field of Search ...................... 363/21.01, 95, 363/97, 131, 21.04, 21.05

(56) References Cited

U.S. PATENT DOCUMENTS

| | | | | |
|---|---|---|---|---|
| 5,754,414 | | 5/1998 | Hanington | 363/21 |
| 5,831,837 | * | 11/1998 | Coyne et al. | 363/21 |
| 5,841,643 | * | 11/1998 | Schenkel | 363/21 |
| 5,903,452 | * | 5/1999 | Yang | 363/97 |
| 5,999,421 | * | 12/1999 | Liu | 363/21 |
| 6,049,471 | * | 4/2000 | Korcharz et al. | 363/20 |
| 6,118,675 | * | 9/2000 | Lionetto et al. | 363/21 |
| 6,137,696 | * | 10/2000 | Hall et al. | 363/21 |

* cited by examiner

Primary Examiner—Adolf Deneke Berhane
(74) Attorney, Agent, or Firm—Steven R. Biren

(57) ABSTRACT

A converter for the conversion of an input voltage between a first supply terminal and a second supply terminal into an output voltage, including a switching means which in operation are turned on and off alternatively under control of a control signal, an inductive element which together with the switching means forms a series arrangement coupled between the firs supply terminal and the second supply terminal, a control circuit for supplying the control signal, and evaluation means for evaluating a voltage across the switching means, which voltage exhibits ringing, and for supplying an evaluation signal to the control circuit. The frequency of the control signal is approximately constant and is determined by an oscillator. The control circuit turns on the switching means only when at the same time: the evaluation signal indicates that the voltage is smaller than the input voltage, and a further evaluation signal indicates that the derivative with respect to time of the voltage is smaller than or equal to zero, and the derivative with respect to time of the voltage equals a reference value.

5 Claims, 5 Drawing Sheets

US 6,256,210 B1

CONVERTER FOR CONVERSION OF AN INPUT VOLTAGE INTO AN OUTPUT VOLTAGE

BACKGROUND OF THE INVENTION

The invention relates to a converter for the conversion of an input voltage between a first supply terminal and a second supply terminal into an output voltage, including switching means which in operation are turned on and turned off alternately under control of a switch control signal, an inductive element which together with the switching means forms a series arrangement coupled between the first supply terminal and the second supply terminal, a control circuit for the supply of the switch control signal, and evaluation means for the evaluation of a voltage across the switching means, which voltage exhibits ringing, and for the supply of an evaluation signal to the control circuit.

FIG. 1 shows such a converter and is known from U.S. Pat. No. 5,754,414. A primary winding of a transformer 12, together with a switching transistor 18, is coupled between a first supply terminal $V_S$ and a second supply terminal GND so as to receive an input voltage $V_S$. The transformer 12 also has a secondary winding 30. A voltage supplied by the secondary winding 30 is rectified by means of a diode 32 and is subsequently smoothed by a smoothing capacitor 34, which results in an output voltage $V_O$ between an output terminal $V_O$ and the second supply terminal GND. The operation of the known converter is now explained with reference to FIGS. 1 to 3. Between the instants to and ti the base voltage $V_b$ (with respect to the second supply terminal GND) of the switching transistor 18 is substantially 0 V, as a result of which the switching transistor 18 is not in conduction. Consequently, the collector $V_c$ (with respect to the second supply terminal GND) of the switching transistor 18 is substantially equal to the input voltage $V_S$. At the instant $t_1$ the base voltage $V_b$ is increased to such an extent that the switching transistor 18 is driven into full conduction, as a result of which the collector voltage $V_c$ becomes substantially equal to 0 V. The voltage $V_b$ remains high till the instant $t_2$. A direct consequence of this is that between the instant $t_1$ and $t_2$ the voltage across the primary winding of the transformer 12 is substantially equal to the input voltage $V_S$, as a result of which energy is stored in the primary winding of the transformer 12. As a result of this, the stored energy is transferred to the secondary winding 30 and eventually, via the rectifier diode 32, to a load (not shown in the Figures), which load may be coupled between the output terminal $V_O$ and the second supply terminal GND. The abrupt turn-off of the switching transistor 18 at the instant $t_2$ causes a sudden increase of the collector voltage $V_c$ as a result of the self-inductance of the primary winding. The collector voltage $V_c$ right after the instant $t_2$ is therefore substantially higher than the input voltage $V_S$. Subsequently, the collector voltage $V_c$ begins to decrease as indicated by the reference numeral 44 in FIG. 2. From a given instant, indicated by the reference numeral 82, the collector voltage $V_c$ starts ringing. It is to be noted that FIGS. 2 and 3 are shown in said United States Patent Specification in order to illustrate the operation of conventional converters. However, FIGS. 2 and 3 are now also used to illustrate the operation of the converter known from said United States Patent Specification. Thus, said United States Patent Specification states, as shown in FIGS. 2 and 3, that many conventional converters operate with a fixed switching frequency f. The switching frequency f is then low enough to achieve that at an instant $t_3$, which corresponds to the instant $t_1$, the collector voltage $V_c$ exhibits hardly or no ringing, as a result of which at the instant $t_3$ the switching transistor 18 can be turned on again without the risk of the collector voltage $V_c$ being much higher than the input voltage $V_S$, as a result of which the switching transistor 18 could be damaged. Moreover, at the instant that the collector voltage $V_c$ has stopped ringing it can be ascertained that the energy transfer from the transformer 12 to the load has ceased. Since such conventional converters operate with a fixed switching frequency f which is so low that it is certain that at the instant $t_3$ the collector voltage $V_c$ has stopped ringing, such conventional converters are not suitable for uses which require a high switching frequency f. For this reason, steps have been taken in the known converter as disclosed in said United States Patent Specification, to render the converter suitable for operation with a high switching frequency f The essence is that the converter each time, i.e. also when the ringing frequency changes, adapts the switching frequency f in such a way that the switching transistor 18 is turned on at the first minimum of the ringing collector voltage $V_C$, which first minimum bears the reference numeral 84 in FIG. 2. The energy transfer from the transformer 12 to the load has then not yet been completed. However, when it is born in mind that ringing does not arise until the instant at which the rectifier diode 32 is leaving the conductive state, it is evident that the major part of the energy has already been transferred to the load. The ringing frequency of the collector voltage $V_c$ depends, for example, on the type of transformer used. For this reason, said United States Patent Specification states that the switching frequency f of the converter should be variable and should automatically adapt itself so as to achieve that the instant $t_3$, as shown in FIG. 2, substantially coincides with the first minimum 84 of the ringing collector voltage $V_C$. Said United States Patent Specification therefore explicitly states that the conventional converters having a fixed switching frequency are unfavorable. This is because the switching transistor 18 then cannot always be turned on at the first minimum 84 of the ringing collector voltage $V_C$.

A disadvantage of the known converter as described in said United States Patent Specification is that it is not suitable for uses where a substantially constant switching frequency is desirable. This may, for example, result in the switching frequency assuming a very high value, which may adversely affect the efficiency of the converter.

SUMMARY OF THE INVENTION

It is an object of the invention to provide a converter which does not have the above-mentioned disadvantage.

To achieve this, according to the invention, the converter defined in the opening paragraph is characterized in that the switch control signal has an approximately constant frequency which is determined by and substantially equal to the constant frequency of an oscillator signal supplied by an oscillator, and the control circuit turns on the switching means only when the evaluation signal indicates that the voltage across the switching means is smaller than the input voltage and when, in addition, a further evaluation signal supplied by the evaluation means indicates that the derivative with respect to time of the voltage across the switching means is smaller than or equal to zero and when, in addition, the derivative with respect to time of the voltage across the switching means is equal to a reference value.

The evaluation signal guarantees that the switching means can never be switched on when the voltage across the switching means is higher than the input voltage. A further reduction of the voltage range of the voltage across the switching means where the switching means can be turned on is achieved by means of the further evaluation signal. This is particularly favorable when a negative value very close to the value zero is chosen for the reference value. After all, the aim is to turn on the switching means at an instant at which the voltage across the switching means exhibits a local minimum. However, electronic control circuits always require a certain response time. Allowance can then be made for this response time by selecting the reference value not to be zero but to be equal to a small negative value. Thus, in spite of the required response time, the switching means can yet be turned on at an instant at which the voltage across the switching means exhibits a local minimum. Apart from said three requirements to be met before the switching means are allowed to be turned on, there is another very important requirement, namely that the switch control signal has an approximately constant frequency which is dictated by and is substantially equal to the constant frequency of the oscillator signal supplied by the oscillator. The switching means can then be turned on only when the oscillator signal changes over from a first signal level, for example a low level, to a second signal level, for example a high level, the repetition rate of said change in level being (substantially) constant. The switching means are then turned on at the next local minimum that appears after said change in level has occurred. This local minimum can be, for example, the first, the second, the third etc. minimum. Thus, the switching means are not necessarily turned on at the first local minimum, which is in contradistinction to the known converter in accordance with the afore-mentioned United States Patent Specification. The possibility of choosing another local minimum at which the switching means are turned on is based on the recognition that the frequency of the ringing voltage is much higher than the frequency of the oscillator signal. Frequency variations on the voltage across the switching means then eventually result in variations in the selection of a local minimum, as a result of which the frequency of the converter remains substantially constant and is, in fact, determined by the frequency of the oscillator signal.

BRIEF DESCRIPTION OF THE DRAWING

The invention will now be described in more detail with reference to the accompanying drawings, in which:

In FIGS. 4 through 6 like parts or elements bear the same reference symbols.

DESCRIPTION OF THE PREFERRED EMBODIMENTS

Figure 1:
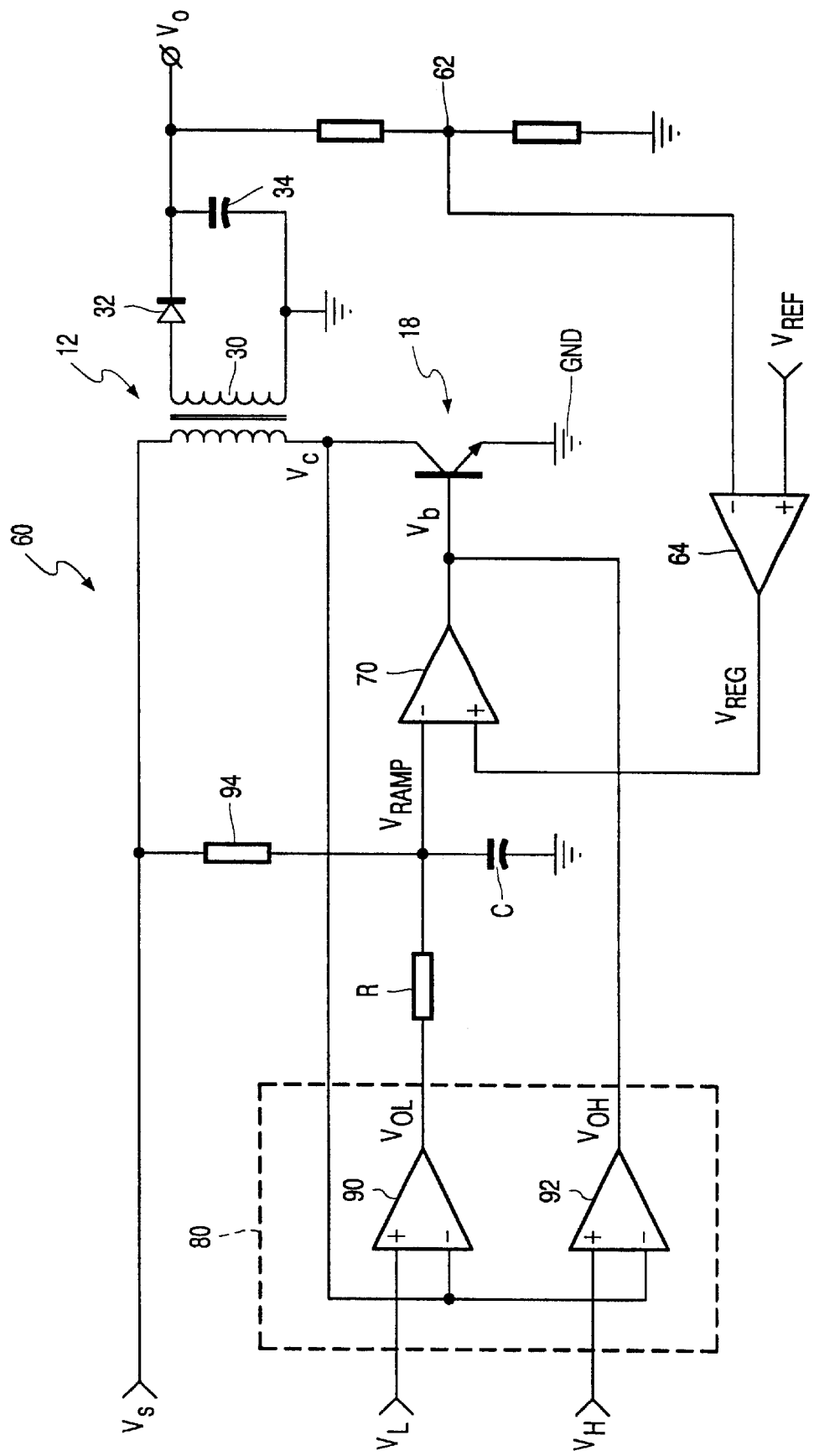
FIG. 1 shows an electrical circuit diagram of a known converter as proposed in U.S. Pat. No. 5,754,414.
Figure 2:
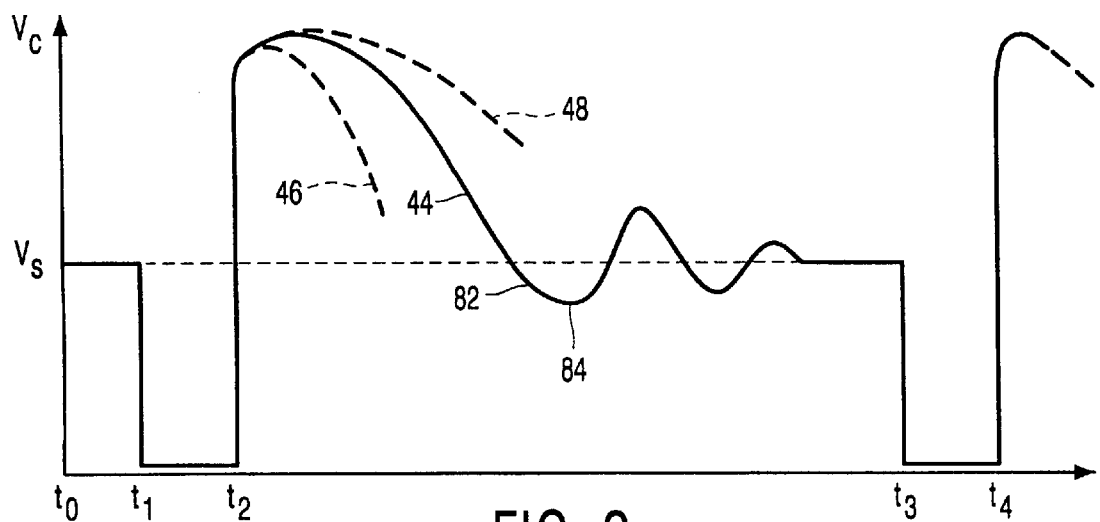
FIGS. 2 and 3 show graphs for a further explanation of the electrical circuit diagram of FIG. 1.
Figure 3:
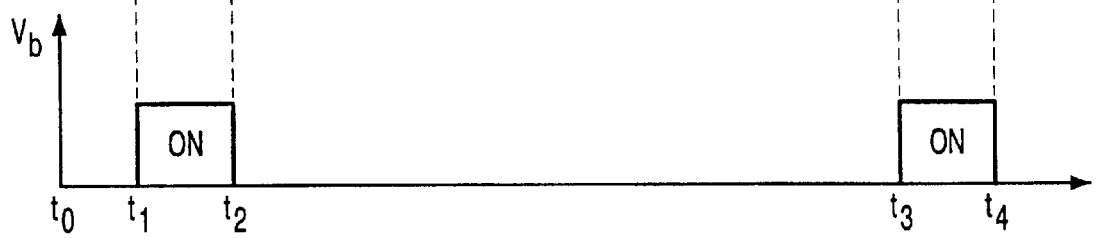
Figure 4:
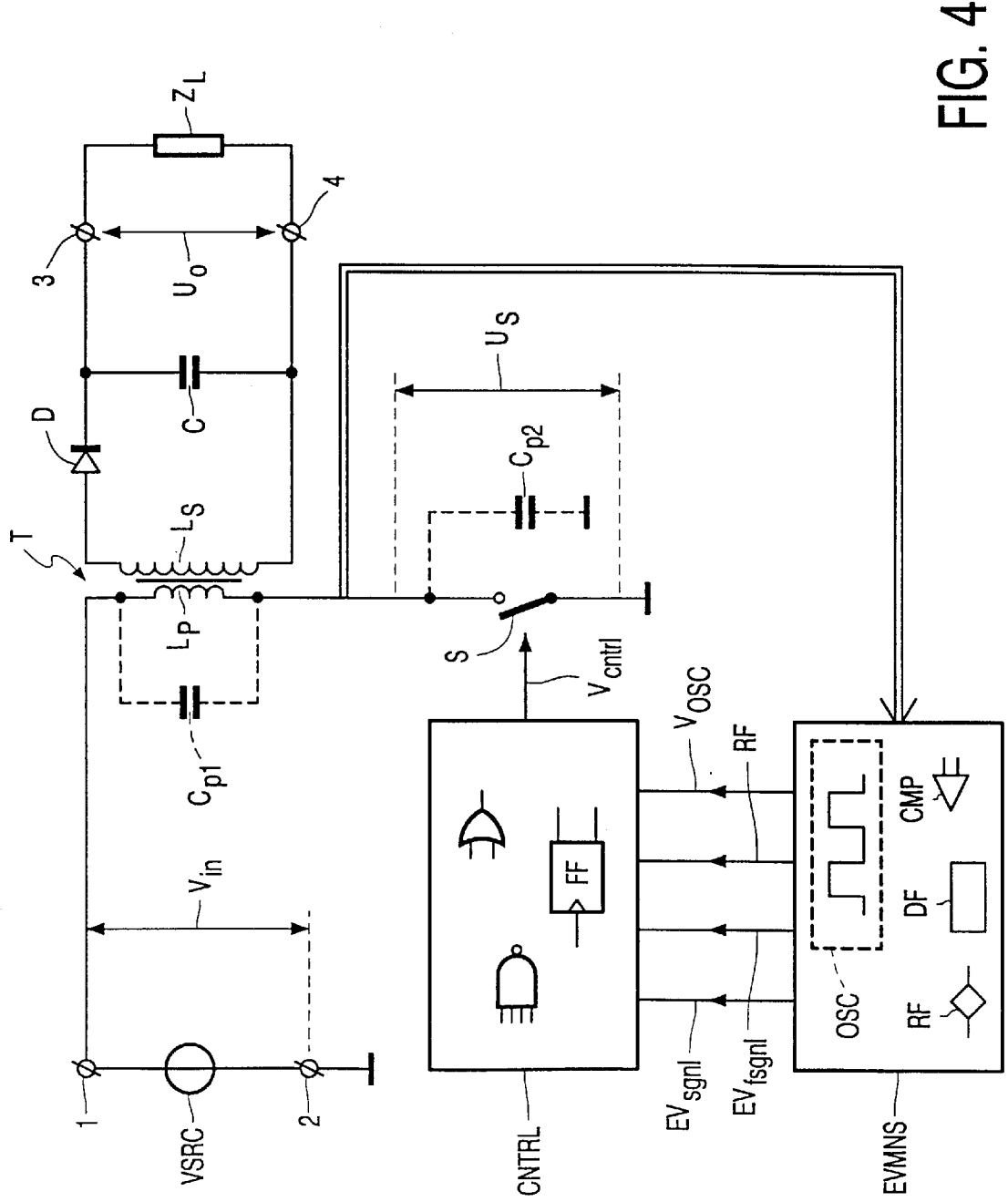
FIG. 4 shows an electrical circuit diagram of an embodiment of a converter in accordance with the invention.

FIG. 4 shows an electrical circuit diagram of a converter embodying the invention. The converter includes switching means S, i.e. a switch S which is alternately turned on and turned off under control of a switch control signal $V_{cntrl}$, and an inductive element T, which in the present example comprises a transformer T having a primary winding $L_P$ and a secondary winding $L_S$. The switch S and the primary winding $L_P$ together form a series arrangement having a first terminal connected to a first supply terminal 1 and having a second terminal connected to a second supply terminal 2 so as to receive an input voltage $V_{in}$ supplied by a voltage source VSRC. A first capacitor $C_{p1}$ is a parasitic capacitance of the primary winding $L_P$. A second capacitor $C_{p2}$ is a parasitic capacitance of the switch S. A rectifier diode D is coupled between a first terminal of the secondary winding $L_S$ and a first output terminal 3. A second terminal of the secondary winding $L_S$ is connected to a second output terminal 4. A smoothing capacitor C is coupled between the first output terminal 3 and the second output terminal 4. A load $Z_L$ is coupled between the first output terminal 3 and the second output terminal 4 so as to receive an output voltage $U_O$. The converter further comprises a control circuit CNTRL for the supply of a switch control signal $V_{cntrl}$ to the switch S and evaluation means EVMNS for the evaluation of a voltage $U_S$ across the switch S. The evaluation means EVMNS supply an evaluation signal $EV_{sgnl}$ a further evaluation signal $EV_{fsgnl}$, an oscillator signal $V_{OSC}$, and a signal representative of a reference value RF to the control circuit CNTRL.

Figure 5:
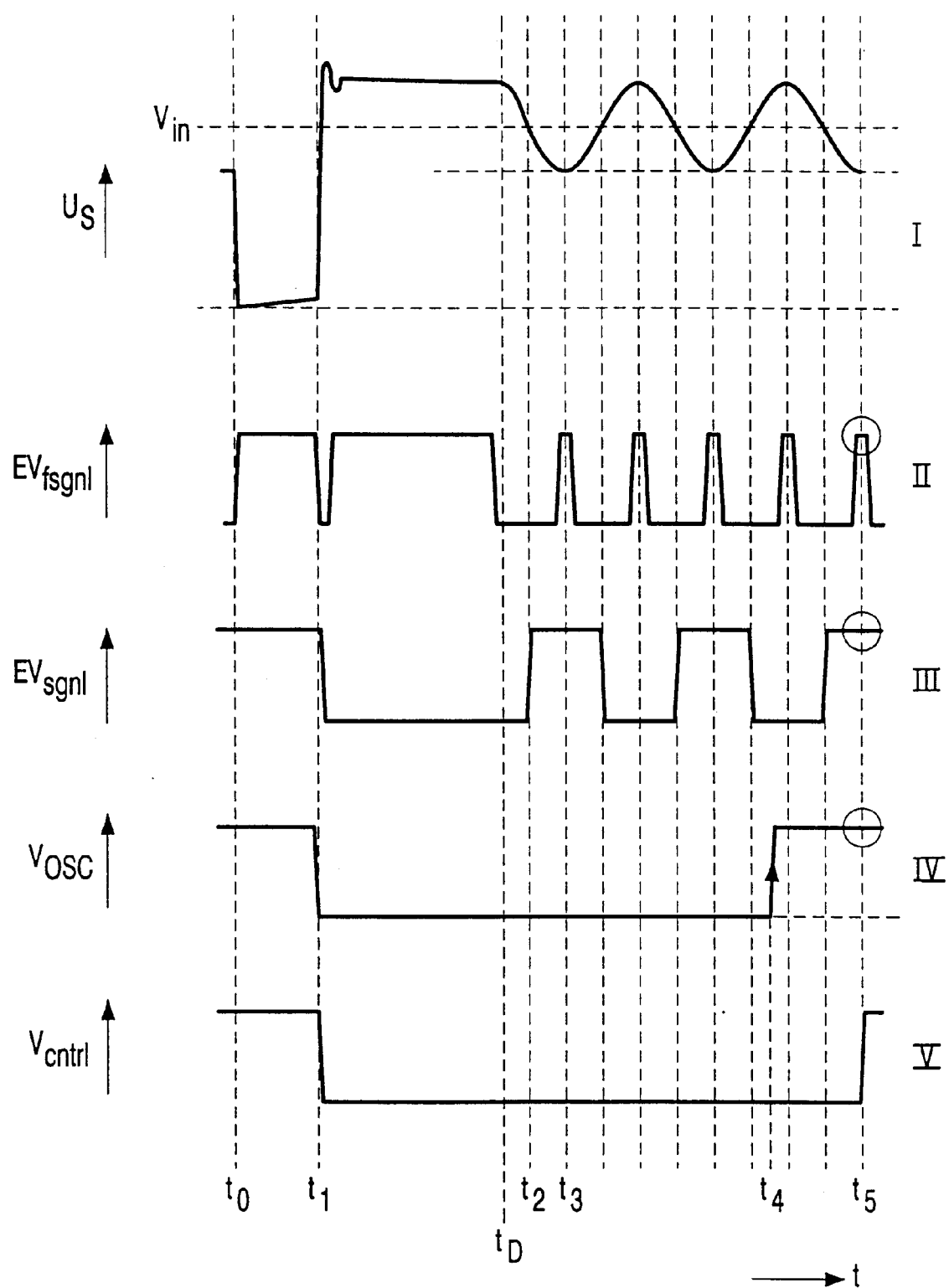
FIG. 5 show a set of signal waveforms for a further explanation of the embodiments shown in FIGS. 4 and 6.

The operation of the embodiment as shown in FIG. 4 will be further clarified with reference to the set of signal waveforms I, II, III, IV and V shown in FIG. 5. The reference value RF is assumed to be zero. Between an instant $t_0$ and an instant $t_1$ the switch control signal $V_{cntrl}$ has such a high value that the switch S is closed. As a result of this, the voltage across the primary winding $L_P$ is substantially equal to the input voltage $V_{in}$. Between the instant to and the instant $t_1$ energy is stored in the primary winding $L_P$ of the transformer T. At the instant $t_1$ the switch control signal $V_{cntrl}$ becomes substantially equal to zero volt, as a result of which the switch S opens. From the instant $t_1$ the energy stored in the primary winding $L_P$ is transferred to the secondary winding $L_S$ and is subsequently supplied to the load $Z_L$ via the rectifier diode D. Approximately from an instant $t_D$ the current through the rectifier diode D has become so small that the rectifier diode virtually functions as an open circuit. As a result, the transformer T is substantially in a no-load state from approximately the instant $t_D$, as a result of which a resonant circuit formed by the primary winding $L_P$ and the parallel arrangement (via the voltage source VSCR) of the first capacitor $C_{p1}$ and the second capacitor $C_{p2}$ is substantially undamped. As a result of this, the voltage $U_S$ across the switch S begins to oscillate. The first local minimum of the voltage $U_S$ appears at an instant $t_3$. In the known converter the switch S would be closed again at the instant $t_3$. However, this is not effected in the converter in accordance with the invention because the switch control signal $V_{cntrl}$ has an approximately constant frequency, which is determined by the oscillator signal $V_{OSC}$. At an instant $t_4$ the oscillator signal $V_{OSC}$ changes from a low level to a high level. The oscillator OSC thus indicates that the switch S is basically allowed to close again. However, since the instant $t_4$ does not coincide with a local minimum at least one of the two signals, i.e. the evaluation signal $EV_{sgnl}$ and the further evaluation signal $EV_{fsgnl}$, has a low level. At an instant $t_5$ the evaluation signal $EV_{sgnl}$, the further evaluation signal $EV_{fsgnl}$ as well as the oscillator signal $V_{OSC}$ for the first time all have a high level. At the instant $t_5$ (which corresponds to the first local minimum after the oscillator signal $V_{OSC}$ has assumed a high level) the switch S is therefore closed again so that again energy is stored in the primary winding $L_p$ of the transformer T.

If the frequency of the oscillating voltage $U_S$ changes owing to some cause, the converter can turn on the switch S again at another than the third local minimum of the oscillating voltage $U_S$ (as is shown in FIG. 5). However, since the switch S can be turned on only after the oscillator signal $V_{OSC}$ has assumed a high level and since the frequency of the oscillating voltage $U_S$ is much higher than the frequency of the oscillator OSC, the switching frequency of the converter remains substantially constant.

Figure 6:
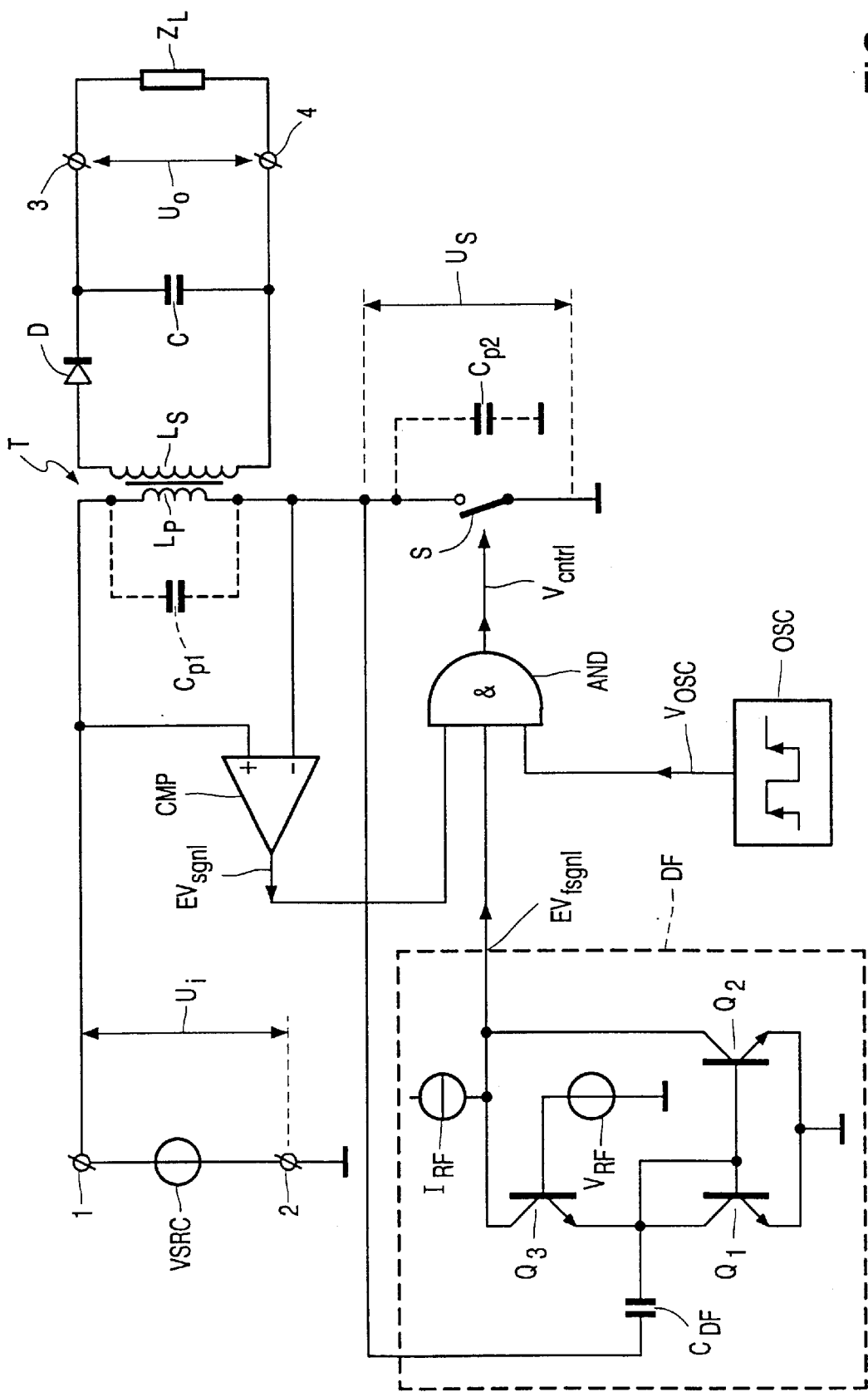
FIG. 6 shows an electrical circuit diagram of a further embodiment of a converter in accordance with the invention.

FIG. 6 shows an electrical circuit diagram of a further embodiment of a converter in accordance with the invention. The converter includes a comparator CMP having an output connected to a first input of an AND gate AND, for the supply of the evaluation signal $EV_{sgnl}$. The comparator CMP has a positive input connected to the first supply terminal 1 and a negative input connected to the node common to the primary winding $L_p$ and the switch S. As a result of this, the evaluation signal $EV_{sgnl}$ only has a high level when the voltage $U_S$ is lower than the input voltage $V_{in}$ (see also the signal waveforms I and III in FIG. 5). The converter further includes a differentiator DF having an input connected to the node common to the primary winding $L_p$ and the switch S and having an output connected to a second input of the AND gate AND, for the supply of the further evaluation signal $EV_{fsgnl}$. The further evaluation signal $EV_{fsgnl}$ has a high level only when the derivative with respect to time of the voltage $U_S$ equals approximately zero (see also the signal waveforms I and II in FIG. 5). The oscillator OSC supplies the oscillator signal $V_{OSC}$ to a third input of the AND gate AND. The switch control signal $V_{cntrl}$ has a high level only when all the inputs of the AND gate AND have a high level.

The differentiator DF includes a first bipolar transistor $Q_1$ having a collector and a base interconnected and having an emitter connected to the second supply terminal 2; a second bipolar transistor $Q_2$ having an emitter connected to the second supply terminal 2 and having a base connected to the base of the first bipolar transistor $Q_1$; a third bipolar transistor $Q_3$ having an emitter connected to the collector of the first bipolar transistor $Q_1$ and having a collector connected to the second input of the AND gate AND; a capacitive element $C_{DF}$ or capacitor $C_{DF}$ coupled between, on the one hand, the node common to the primary winding $L_P$ and the switch S and, on the other hand, the emitter of the third bipolar transistor $Q_3$; a reference voltage source $V_{RF}$ coupled between a base of the third bipolar transistor $Q_3$ and the second supply terminal 2; and a reference current source $I_{RF}$ coupled to the collector of the second bipolar transistor $Q_2$ and to a collector of the third bipolar transistor $Q_3$.

The differentiator DF operates as follows. The first and the second bipolar transistor $Q_1$ and $Q_2$ together form a current mirror. A positive current through the capacitor $C_{DF}$ (i.e. towards the emitter of the third bipolar transistor $Q_3$ and the collector of the first bipolar transistor $Q_1$) is reflected by the current mirror and consequently appears inverted at the output of the current mirror, which output is formed by the collector of the second bipolar transistor $Q_2$. A negative current through the capacitor $C_{DF}$ flows through the third bipolar transistor $Q_3$ (and not through the current mirror) and is therefore not inverted. As is shown in FIG. 6, the differentiator DF in fact acts as a current rectifier. If the absolute value of the positive or the negative current through the capacitor $C_{DF}$ is smaller than the current supplied by the reference current source $I_{RF}$ the further evaluation signal $EV_{fsgnl}$ has a high level, and in other cases the further evaluation signal $EV_{fsgnl}$ has a low level.

The signal representative of the reference value RF and shown in FIG. 4 is not shown in FIG. 6. This is because in the differentiator DF, as is shown in FIG. 6, the reference value RF is also determined by the differentiator DF. The further evaluation signal $EV_{fsgnl}$ is therefore also influenced by the reference value RF. The reference value RF can be adapted by adapting the current mirror ratio of the current mirror, which ratio is determined by the ratio between the emitter areas of the first and the second bipolar transistor $Q_1$ and $Q_2$. The voltage reference source $V_{RF}$ provides the d.c. bias for the third bipolar transistor Q3.

The converter may alternatively be provided with a differentiator of another type. Moreover, a single coil may be used instead of a transformer T. The switch S may be realized for example by means of a MOS transistor, a bipolar transistor, a thyristor, or a relay. The converter may be incorporated in an integrated circuit or it may be formed by means of discrete components

What is claimed is:

1. A converter for the conversion of an input voltage ($U_i$) between a first supply terminal (1) and a second supply terminal (2) into an output voltage ($U_0$), comprising:

switching means (S) which in operation are turned on and turned off alternately under control of a switch control signal ($V_{cntrl}$), an inductive element (T) which together with the switching means (S) forms a series arrangement coupled between the first supply terminal (1) and the second supply terminal (2), a control circuit (CNTRL) for the supply of the switch control signal ($V_{cntrl}$), and evaluation means (EVMNS) for the evaluation of a voltage ($U_S$) across the switching means (S), which voltage ($U_S$) exhibits ringing, and for the supply of an evaluation signal ($EV_{sgnl}$) to the control circuit (CNTRL), characterized in that the switch control signal ($V_{cntrl}$)

has an approximately constant frequency which is determined by and substantially equal to the constant frequency of an oscillator signal ($V_{OSC}$) supplied by an oscillator (OSC), and the control circuit (CNTRL) turns on the switching means (S) only when the evaluation signal ($EV_{sgnl}$) indicates that the voltage ($U_S$) across the switching means (S) is smaller than the input voltage ($U_i$) and when, in addition, a further evaluation signal ($EV_{sgnl}$) supplied by the evaluation means (EVMNS) indicates that the derivative with respect to time of the voltage ($U_S$) across the switching means (S) is smaller than or equal to zero and when, in addition, the derivative with respect to time of the voltage ($U_S$) across the switching means (S) is equal to a reference value (RF).

2. A converter as claimed in claim 1, characterized in that the reference value (RF) is approximately zero.

3. A converter as claimed in claim 1, characterized in that the evaluation means (EVMNS) comprise a comparator (CMP) having a first and a second input, which first and second input are coupled parallel to the inductive element (L), and having an output for the supply of the evaluation signal ($EV_{sgnl}$).

4. A converter as claimed in claim 1, characterized in that the evaluation means (EVMNS) comprise a differentiator (DF) adapted to differentiate the voltage ($U_S$) across the switching means (S) and to supply the further evaluation signal ($EV_{fsgnl}$).

5. A converter as claimed in claim 4, characterized in that the differentiator (DF) comprises a capacitive element ($C_{DF}$) and the differentiator (DF) is adapted in a manner that a voltage ($U_C$) across the capacitive element (C) is substantially equal to the voltage ($U_S$) across the switching means (S) in such a way that the current through the capacitive element ($C_{DF}$) is a measure of the derivative with respect to time of the voltage ($U_S$) of the switching means (S).

* * * * *